Patented July 11, 1939

2,165,655

UNITED STATES PATENT OFFICE 2,165,655

PROCESS OF MAKING THE ESTERS OF POLYNUCLEAR HYDROXYKETONES

Leopold Ruzicka, Zurich, Switzerland, assignor to firm of Society of Chemical Industry in Basle, Basel, Switzerland No Drawing. Application October 26, 1935, Serial No. 46,966. In Switzerland November 6, 1934

6 Claims. (Cl. 260—397)

In specification Ser. No. 747,989, filed October 11, 1934, is described a manufacture of polynuclear cyclic ketones from sterols or bile acids containing saturated ring systems, or from their derivatives or partial degradation products. The manufacture described in the said specification comprises treating with an oxidizing agent a derivative of the sterol or bile acid in which the hydroxyl-groups in the nucleus have been protected against direct oxidation, for instance by substitution of their hydrogen atoms, such as by the formation of esters, or by replacement of the hydroxyl-groups by halogen. From the reaction mass resulting from the oxidation the neutral portions are separated, the volatile reaction products are expelled and the cyclic ketones contained in the non-volatile portions are separated by means of ketone reagents, if desired after previous distillation, and the products so obtained are treated with an agent having an hydrolytic action.

Esters of the hydroxyketones obtainable by the aforesaid manufacture are of particular interest. They can be obtained by esterification of the hydroxyketones themselves. They are also formed intermediately during the hydrolysis of the reaction products obtained in the aforesaid manufacture by the action of a ketone reagent on the hydroxyketones esterified in the hydroxyl-groups. However, when the hydrolysis occurs under energetic conditions, the ester-groups which are present are wholly or in part split off with the formation of the hydroxyketone.

In accordance with the invention the esters may be easily obtained by subjecting the starting materials to a mild hydrolysis, for instance with the aid of a strong acid in the presence of a small proportion of water, and, if required, in the presence of an organic solvent for the reactants, such as for instance an alcohol, glacial acetic acid or mixtures thereof. By such a mild treatment only the residu of the ketone reagent is eliminated whilst the ester groups remain undecomposed.

The following examples illustrate the invention:—

Example 1

30 mgs. of the semicarbazone of the acetate of the hydroxyketone resulting from the oxidation of epi-dihydrocholesterin acetate are heated for half-an-hour on a water bath with 2 grams of a solution obtainable by mixing together 9 grams of glacial acetic acid, 1 gram of concentrated sulfuric acid and 1 gram of water. The reaction mixture is then mixed with ice and sodium carbonate and the acetate of the hydroxyketone which is precipitated is extracted with ether. When recrystallized from methyl alcohol it melts at 164–165° C. (corrected). It has the following formula:—

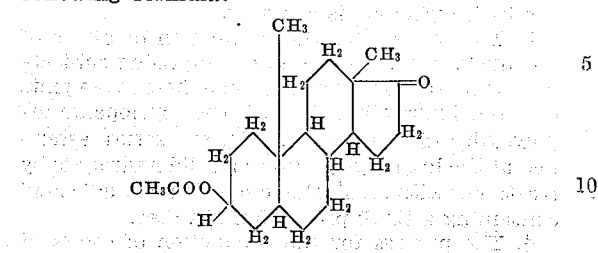

In a similar manner there is for instance obtained the propionate of the hydroxyketone of melting point 151–152° C. by treating the semicarbazone of the propionate of the above hydroxyketone with sulfuric acid and water in the presence of propionic acid.

Example 2

0.5 gram of the semicarbazone (melting point 251–252° C., corrected) of the benzoate of the hydroxyketone resulting from the oxidation of the benzoate of dihydro-cholesterin is heated with a solution of 5 grams of crystallized oxalic acid in 20 cc. of an alcohol like methyl, ethyl or isopropyl alcohol of 95 per cent. strength to boiling for 24 hours. The clear solution is then evaporated and the residue shaken with ether and water. The ethereal layer is evaporated to dryness and the residue recrystallized from methyl alcohol or benzine. The benzoate of the hydroxyketone thus obtained of the formula

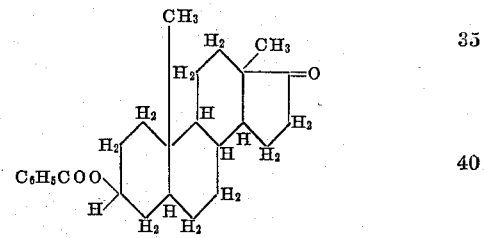

melts with decomposition at 215° C. (corrected). Alkaline saponification of the benzoate yields the free hydroxyketone which melts at 174–175.5° C. (corrected).

In a quite analogous manner there is also obtained the androsterone benzoate of melting point 178–178.5° C. from its semicarbazone or oxime obtained after the oxidation of epi-dihydrocholesterin.

In a similar manner there may also be obtained other aromatic esters for instance the toluic acid esters.

What I claim is:

1. The process for the production of esters of polynuclear hydroxyketones, comprising subjecting the products of the reaction of ketone reagents on the hydroxyketones of the cyclopentano-polyhydro-dimethyl-phenanthrene series esterified at the hydroxyl-group to a mild hydrolysis with an acid selected from the group consisting of sulfuric acid and oxalic acid in the presence of small proportions of water and of an organic solvent for the reactants, whereby the ketone reagent is broken up without destruction of the ester.

2. The process for the production of esters of polynuclear hydroxyketones, comprising subjecting the products of the reaction of ketone reagents on the hydroxyketones of the cyclopentano-polyhydro-dimethyl-phenanthrene series esterified at the hydroxyl-group to a mild hydrolysis with sulfuric acid in the presence of a small proportion of water and of an organic solvent for the reactants consisting of the acid with which the hydroxyketone is esterified.

3. The process for the production of esters of polynuclear hydroxyketones, comprising subjecting the products of the reaction of ketone reagents on the hydroxyketones of the cyclopentano-polyhydro-dimethyl-phenanthrene series esterified at the hydroxyl-group to a mild hydrolysis by treatment with an alcoholic solution of oxalic acid containing a small proportion of water.

4. The process for the production of esters of the formula:—

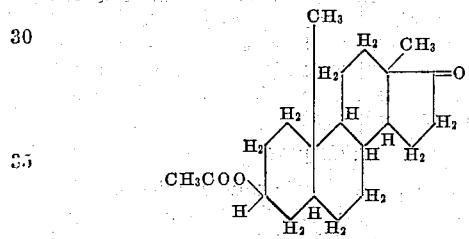

by hydrolyzing their reaction products with ketone reagents with sulfuric acid in the presence of small proportions of water and of acetic acid as a solvent.

5. The process for the production of esters of the formula:—

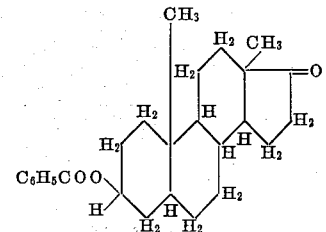

by hydrolyzing their reaction products with ketone reagents with an alcoholic solution of oxalic acid containing small proportions of water.

6. The process for the production of esters of the formula:—

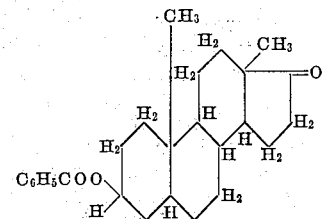

by hydrolyzing their semicarbazones with an alcoholic solution of oxalic acid containing small proportions of water.

LEOPOLD RUZICKA.